S. J. Woland,
Corn Marker.
No. 90,908. Patented June 1, 1869.

Witnesses
James P. Groves
Dennis D. Kane

Inventor
S. J. Woland
Chipman Hosmer
attys

SOLOMON J. WOLAND, OF LINCOLN, ILLINOIS.

Letters Patent No. 90,908, dated June 1, 1869.

IMPROVEMENT IN CORN-MARKER.

The Schedule referred to in these Letters Patent and making part of the same.

*To all whom it may concern:*

Be it known that I, SOLOMON J. WOLAND, of Lincoln, in the county of Logan, and State of Illinois, have invented a new and valuable Improvement in Corn-Markers; and I do hereby declare that the following is a full, clear, and exact description of the construction and operation of the same, reference being had to the annexed drawings, making a part of this specification, and to the letters and figures of reference marked thereon—

Figure 1:
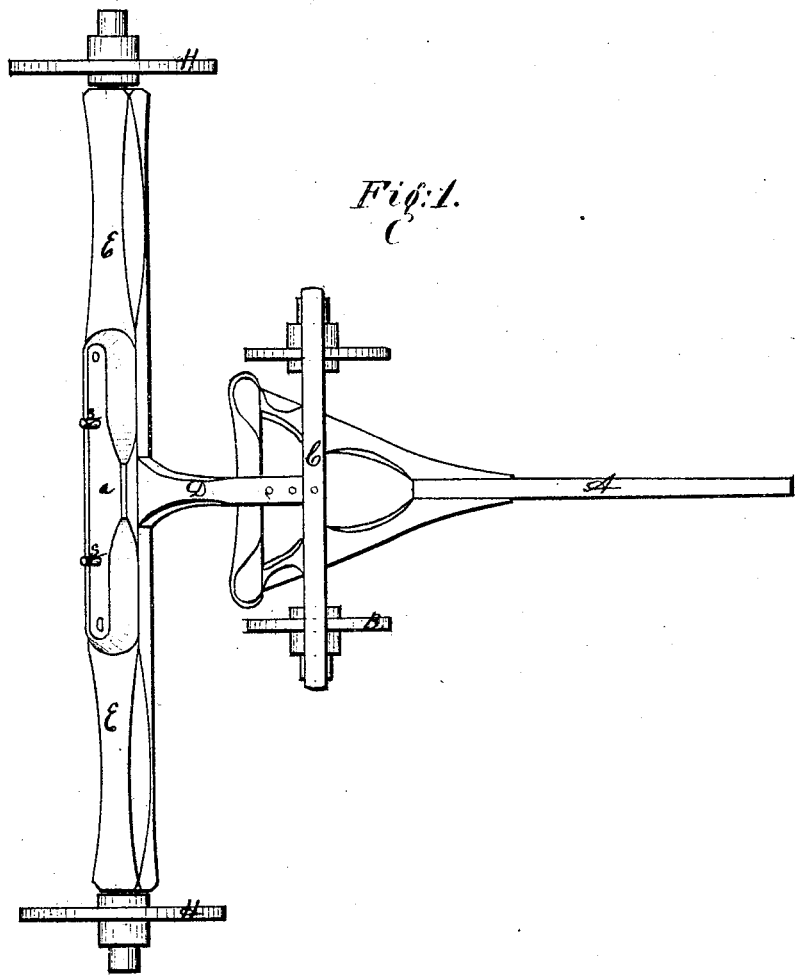

Figure 1 of the drawings is a plan view of my device.

Figure 2:
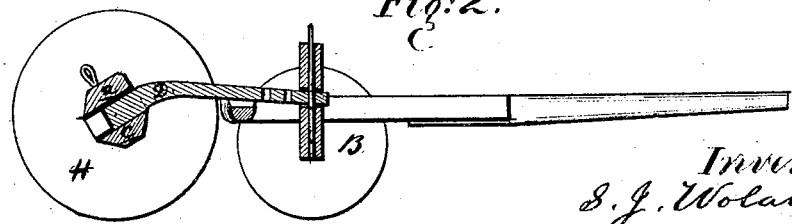

Figure 2 is a longitudinal section of the same.

My invention relates to means for planting corn or other crops in rows; and

It consists mainly in arranging wheels upon axles in such manner that the distance between each two of the wheels shall be the proper space between the rows to be planted, and the wheels in passing shall mark such rows.

It also consists in providing means by which the rear axle and wheels of such a device may be folded upon the forward axle for purposes of transportation.

The letter A, of the drawings, represents a carriage-tongue attached, in the usual manner, to an axle-tree, and to which axle-tree are attached the forward wheels B.

The letter C is a bolster placed upon the forward axle, and jutting out over the wheels B, as shown.

The letter D is a reach, curved upward, as shown on fig. 2.

This curvature is made to aid in the means for folding the rear axle upon the forward one, as hereinafter mentioned. It also serves to unite the two axles of the carriage, in the usual manner.

The letter E is the rear axle-tree, constructed in two sections, as shown, each section being pivoted inside two ties, or supports, marked respectively a and c.

The letters s are pins, removable at will, which pass through the ties a and c, and also through the ends of each section of axle E when in use, but which are withdrawn when the carriage is to be transported.

The letters H are the wheels on the rear axle-trees.

The length of each axle is fixed in such manner that the distance between the wheels B shall be the same as the distance between each of the wheels B and the wheels H respectively.

By this means, when the carriage is drawn forward each wheel serves as a marker for a row of corn.

When desirable, for transportation or otherwise, the pins s are removed, and each section of axle E is turned on its pivot forward until the wheels H rest upon or forward of the bolster C.

What I claim as my invention, and desire to secure by Letters Patent, is—

A corn-marker having wheels B and H, bolster C, sectional and pivoted axle E, pins g, and curved reach D, constructed, arranged, and operating substantially as specified.

In testimony that I claim the above, I have hereunto subscribed my name, in the presence of two witnesses.

SOLOMON J. WOLAND.

Witnesses:
 DAVID H. HARTS,
 ROBERT W. PHILLIPS.